(12) United States Patent
Haruna

(10) Patent No.: US 11,402,035 B2
(45) Date of Patent: Aug. 2, 2022

(54) CLAMPING DEVICE EQUIPPED WITH LIFTING FUNCTION

(71) Applicant: KOSMEK LTD., Hyogo (JP)

(72) Inventor: Yosuke Haruna, Hyogo (JP)

(73) Assignee: KOSMEK LTD., Hyogo (JP)

(*) Notice: Subject to any disclaimer, the term of this patent is extended or adjusted under 35 U.S.C. 154(b) by 1003 days.

(21) Appl. No.: 16/080,477

(22) PCT Filed: Feb. 27, 2017

(86) PCT No.: PCT/JP2017/007537
§ 371 (c)(1),
(2) Date: Aug. 28, 2018

(87) PCT Pub. No.: WO2017/150464
PCT Pub. Date: Sep. 8, 2017

(65) Prior Publication Data
US 2021/0190236 A1 Jun. 24, 2021

(30) Foreign Application Priority Data
Mar. 2, 2016 (JP) .............................. JP2016-056154

(51) Int. Cl.
*F16L 1/00* (2006.01)
*F16L 1/09* (2006.01)
*F16L 5/00* (2006.01)

(52) U.S. Cl.
CPC .. *F16L 1/09* (2013.01); *F16L 5/00* (2013.01)

(58) Field of Classification Search
None
See application file for complete search history.

(56) References Cited

U.S. PATENT DOCUMENTS

2005/0017423 A1* 1/2005 Kita .......................... B25B 5/16
269/32
2012/0319340 A1* 12/2012 Kawakami ............. B23Q 1/009
269/48.3

(Continued)

FOREIGN PATENT DOCUMENTS

CN 102917836 A 2/2013
CN 105813803 A 7/2016

(Continued)

OTHER PUBLICATIONS

Extended European Search Report issued in corresponding European Patent Appln. No. 17759930.5 dated Sep. 23, 2019.

(Continued)

*Primary Examiner* — Steven M Marsh
(74) *Attorney, Agent, or Firm* — Bacon & Thomas, PLLC

(57) ABSTRACT

An advancing-retracting member (3) which is tubular is hermetically inserted into a housing (1) so as to be movable in an vertical direction. An advancing-retracting mechanism (13) is provided to the housing (1) so as to move the advancing-retracting member (3) in the vertical direction. A support cylinder (17) is provided in a manner so as to protrude upward from the advancing-retracting member (3) and be insertable into a hole (21) formed in a workpiece (20). A pressing surface (4) formed in a top end portion of the advancing-retracting member (3) is able to push the workpiece (20) up. In a case where the advancing-retracting mechanism (13) moves the advancing-retracting member (3) upward, the advancing-retracting member (3) causes the support cylinder (17) to be inserted into the hole (21) of the workpiece (20) from below, and the advancing-retracting member (3) presses against the workpiece (20) via the pressing surface (4) so as to move the workpiece (20) upward.

6 Claims, 5 Drawing Sheets

(56) References Cited

U.S. PATENT DOCUMENTS

| 2013/0113146 A1 | 5/2013 | Kawakami |
| 2016/0271758 A1* | 9/2016 | Kawakami .......... F15B 15/2807 |
| 2016/0288297 A1 | 10/2016 | Koshimura |
| 2018/0051723 A1* | 2/2018 | Kojima .............. F15B 15/2807 |
| 2018/0156249 A1* | 6/2018 | Kojima .............. F15B 15/1409 |
| 2020/0230757 A1* | 7/2020 | Yonezawa ................ B23Q 3/06 |
| 2020/0338675 A1* | 10/2020 | Kojima ................... B23Q 3/06 |

FOREIGN PATENT DOCUMENTS

| EP | 2594359 A1 | 5/2013 |
| EP | 2610038 A1 | 7/2013 |
| EP | 3078449 A1 | 10/2016 |
| JP | 20120020354 A | 8/2013 |
| JP | 2015_107543 A | 6/2015 |
| JP | 2016-449 A | 1/2016 |
| KR | 2013_0127422 A | 11/2013 |
| KR | 2016_0094944 A | 8/2016 |
| WO | WO2012_008210 A1 | 1/2012 |
| WO | WO2015_083625 A1 | 6/2015 |

OTHER PUBLICATIONS

International Search Report cited in International Appln. No. PCT/JP2017/007537 dated May 16, 2017.

International Preliminary Report on Patentability dated Feb. 27, 2017.

\* cited by examiner

CLAMPING DEVICE EQUIPPED WITH LIFTING FUNCTION

TECHNICAL FIELD

The present invention relates to a clamping device having a function (lifting function) of lifting an object to be fixed.

BACKGROUND ART

Conventional clamping devices include the device disclosed in Patent Literature 1 (Japanese Patent Application Publication, Tokukai, No. 2016-000449). Such a conventional clamping device is configured as follows.

An advancing-retracting member which is tubular is inserted into a housing so as to be movable in a vertical direction. A piston is inserted into an inner circumferential hole of the advancing-retracting member, so as to be movable in the vertical direction by a driving mechanism. A pull rod is connected to the piston. Guide holes are formed in a circumferential wall of an upper part of the advancing-retracting member. Engaging balls are inserted into respective ones of the guide holes so as to be movable in a radial direction. A wedge portion provided along an outer circumference of the pull rod engages the engaging balls from above in a wedge-like manner. A raising spring, which moves the piston and the advancing-retracting member from a lower limit position to an upper limit position, is provided. A seating surface, on which a workpiece is placed, is formed on an upper surface of the housing.

When the workpiece is to be fixed to the seating surface of the housing, the workpiece is first moved horizontally by a transporting mechanism and then placed on the seating surface of the housing from above. Then, pressurized oil is discharged from a release chamber formed above the advancing-retracting member, and the raising spring moves the advancing-retracting member upward. Pressurized oil is then supplied to a lock chamber formed below the advancing-retracting member, and the pressure of the oil thus supplied causes the advancing-retracting member to be inserted into a hole of the workpiece. While the advancing-retracting member remains supported in its upper limit position, the piston and the pull rod are gradually lowered by the driving mechanism. As this happens, the pull rod presses against the engaging balls to move the engaging balls to an engagement position which is outward in the radial direction, so that the engaging balls engage the hole of the workpiece. This fixes the workpiece to the seating surface of the housing.

CITATION LIST

Patent Literature

[Patent Literature 1]
Japanese Patent Application Publication Tokukai No. 2016-000449 (Publication date: Jan. 7, 2016)

SUMMARY OF INVENTION

Technical Problem

With the above conventional technique, after the workpiece is moved horizontally by a transporting mechanism, the workpiece is placed on the seating surface of the housing from above. However, there are cases in which it is desirable to transport the workpiece by use of a conveying device (such as a conveyor) which moves the workpiece (object to be fixed) only in the horizontal direction. In such cases, in order to prevent the workpiece being conveyed from colliding with the clamping device, it is necessary to position the clamping device such that a gap is left beneath a conveying surface of the workpiece (i.e., a lower surface of the workpiece). However, because the conveyor cannot move the workpiece in the vertical direction, the conveyor cannot place the workpiece on the seating surface of the housing, which seating surface is vertically positioned so as to leave a gap beneath the conveying surface of the workpiece. In order to address this issue, there has been proposed a technique of separately providing a raising and lowering mechanism below the main body of the conventional clamping device. The raising and lowering mechanism raises the main body and lifts the workpiece via the seating surface of the housing.

With the above proposal, it is necessary to provide, below the main body of the clamping device, a raising and lowering mechanism for raising and lowering the main body of the clamping device. Combining the raising and lowering mechanism with the main body of the clamping device and increases the total dimensions of the device. As such, there is room for improvement with regards to compactly producing a clamping device which includes a raising and lowering mechanism for lifting a workpiece.

An object of the present invention is to produce a compact clamping device which has a function of lifting a workpiece.

Solution to Problem

In order to attain the above object, embodiments of the present invention include a clamping device, having a lifting function, which clamping device is for example configured as follows and as illustrated in FIGS. 1 to 3, FIGS. 4A and 4B, or FIGS. 5A and 5B.

An advancing-retracting member 3 which is tubular is inserted into a housing 1 so as to be movable in an axis direction. An advancing-retracting mechanism 13 is provided to the housing 1 and moves the advancing-retracting member 3 in the axis direction. A support cylinder 17 which is provided in a manner so as to protrude in an advancement direction from the advancing-retracting member 3 is insertable into a hole 21 formed in an object to be fixed 20. An output member 24 is hermetically inserted into an inner circumferential hole 22 of the support cylinder 17 so as to be movable in the axis direction. A pushing portion 41 is formed along an outer circumference of an advancement-direction end portion of the output member 24. A driving mechanism 35 provided in the advancing-retracting member 3 moves the output member 24 in the axis direction. Engaging members 39 are inserted into respective guide holes 38 of the support cylinder 17 so as to be movable in a radial direction, the guide holes 38 being formed in a circumferential wall of the support cylinder 17 at predetermined intervals in a circumferential direction. The engaging members 39 each have an inner circumferential surface which the pushing portion 41 engages in a wedge-like manner. A pressing surface 4 formed in an advancement-direction end portion of the advancing-retracting member 3 is able to move the object to be fixed 20 by pressing against the object to be fixed 20. In a case where the advancing-retracting mechanism 13 moves the advancing-retracting member 3 such that the support cylinder 17 is moved in the advancement direction from a position which is more toward a base end side than is a base end surface 20a of the object to be fixed, the support cylinder 17 is inserted into the hole 21 of the object to be fixed 20, and the advancing-retracting member 3 presses against the object to be fixed 20 via the pressing surface 4 so as to move the object to be fixed 20 toward a position downstream in the advancement direction.

Advantageous Effects of Invention

An embodiment of the present invention makes it possible to produce a compact clamping device which has a function of lifting a workpiece.

DESCRIPTION OF EMBODIMENTS

Figure 1:
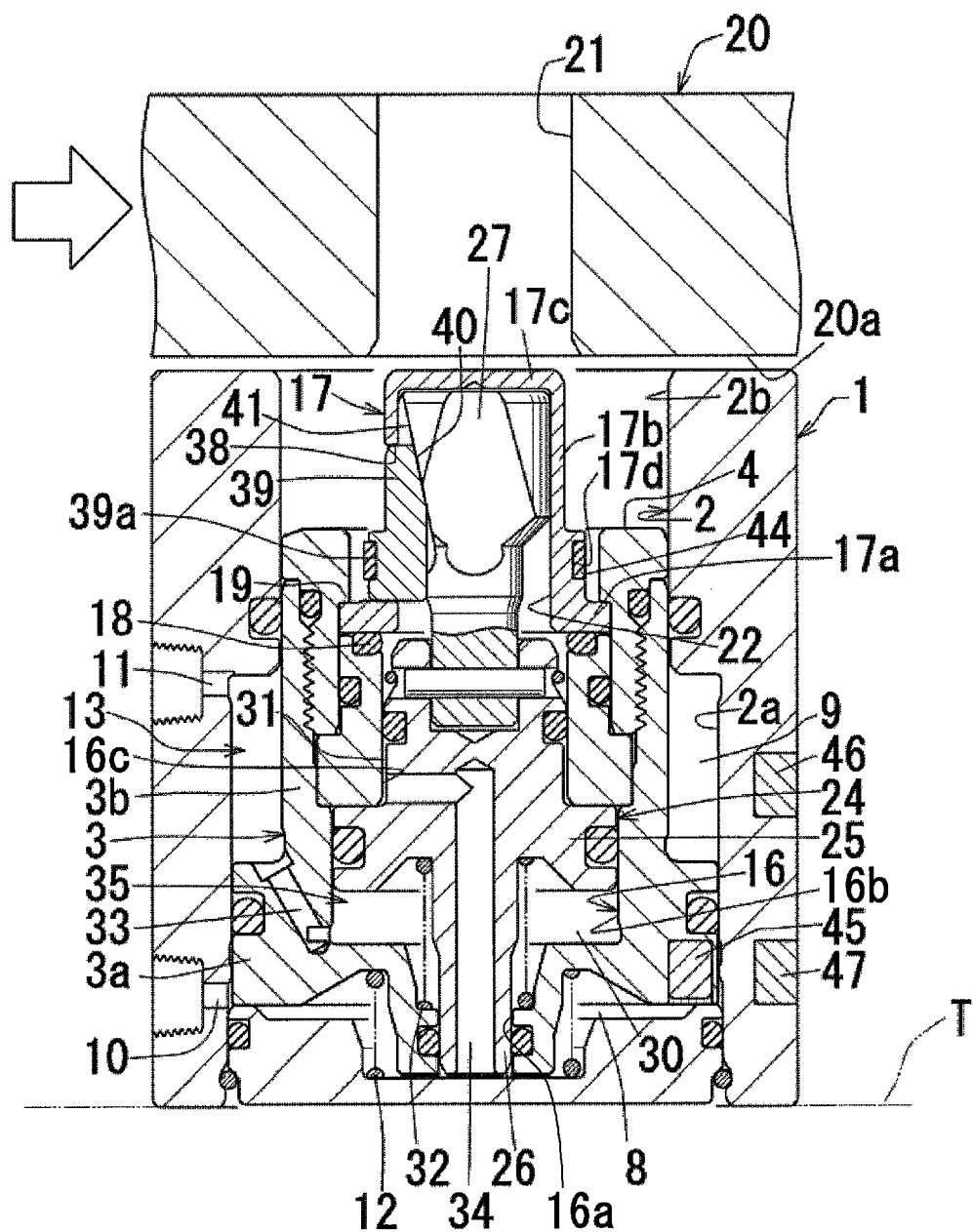
FIG. 1 is an elevational cross-sectional view of Embodiment 1 of the present invention and illustrates a clamping device in a lowered and unclamped state.
Figure 2:
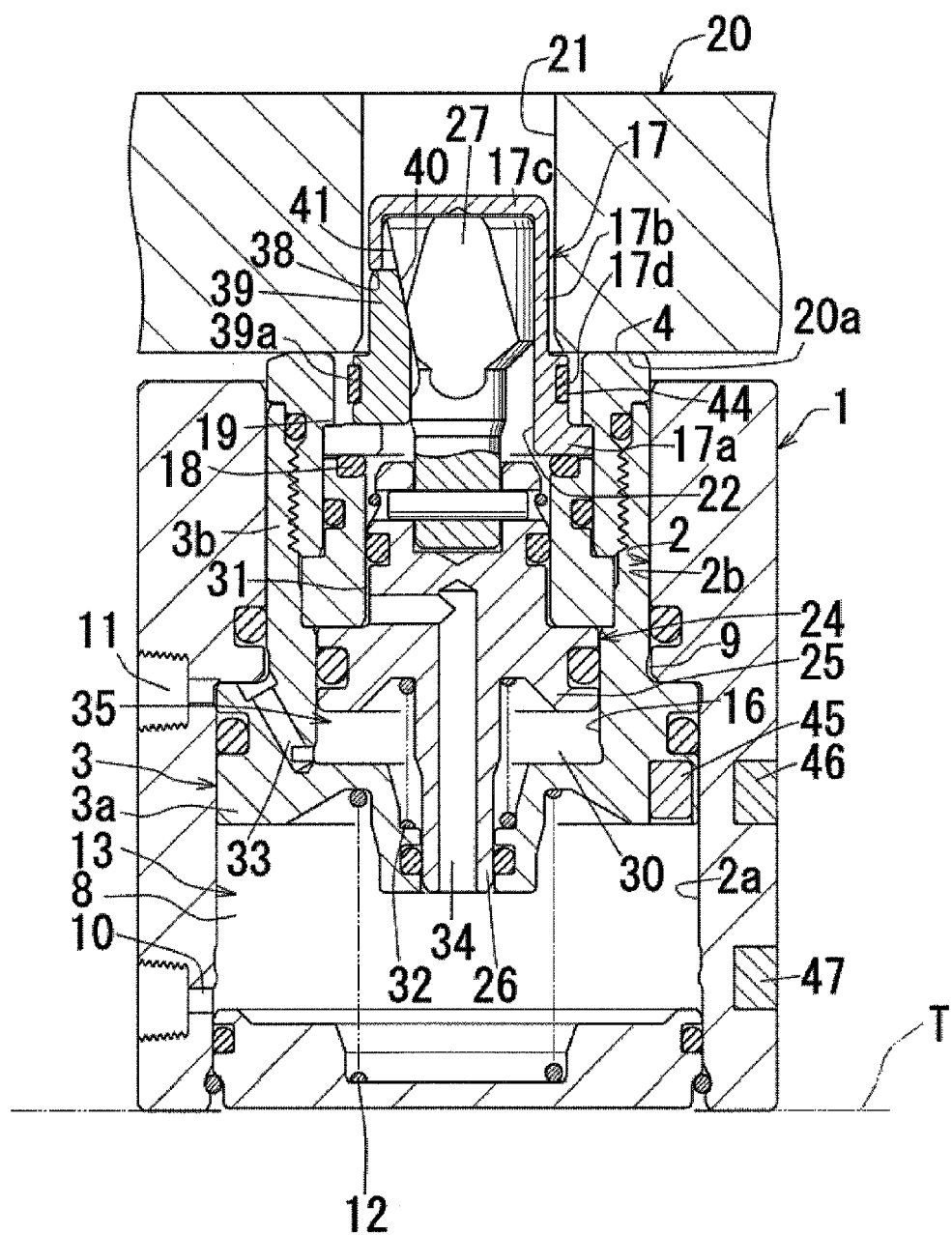
FIG. 2, which is similar to FIG. 1, illustrates the clamping device in a raised and unclamped state.
Figure 3:
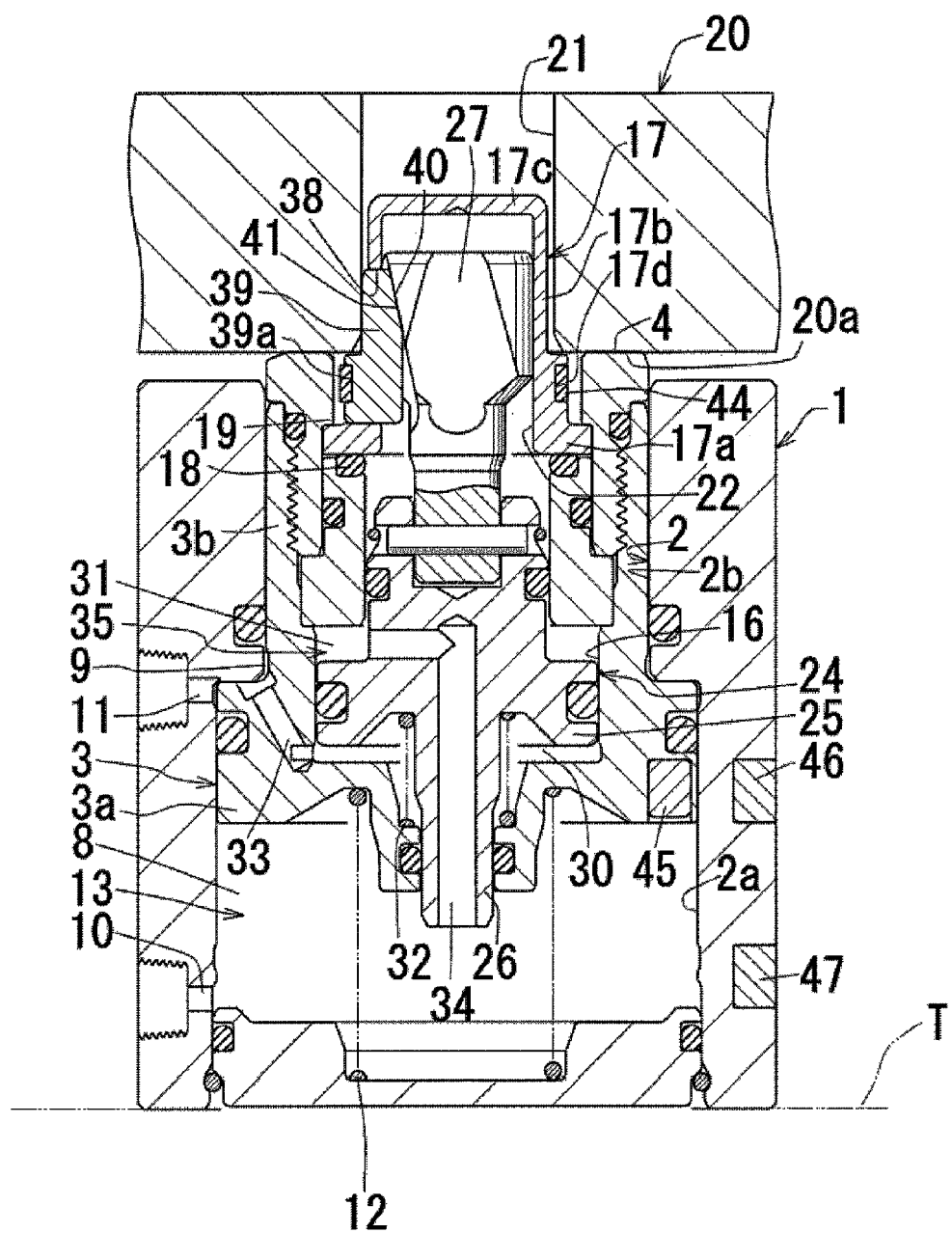
FIG. 3, which is similar to FIG. 1, illustrates the clamping device in a raised and clamped state.

The following description will discuss Embodiment 1 of the present invention with reference to FIGS. 1 to 3.

First, a configuration of a clamping device is discussed mainly with reference to FIG. 1.

A housing 1 of the clamping device is fixed to a table T serving as a fixing base. A containing hole 2 is formed in the housing 1 along a vertical direction (axis direction). The containing hole 2 includes a large-diameter hole 2a and a small-diameter hole 2b, which are provided in this order from bottom (from a base end side) to top. An advancing-retracting member 3 which is tubular is hermetically inserted into the containing hole 2 so as to be movable in the vertical direction. The advancing-retracting member 3 includes a piston portion 3a and a support portion 3b, which are provided in this order from bottom to top. The piston portion 3a is hermetically inserted into the large-diameter hole 2a so as to be movable in the vertical direction. The support portion 3b is hermetically inserted into the small-diameter hole 2b.

A lock chamber 8 is formed below the piston portion 3a, of the advancing-retracting member 3 and a release chamber 9 is formed above (on an advancement direction side of) the piston portion 3a. Pressurized oil is supplied to and discharged from the lock chamber 8 via a lock supply-and-discharge passage 10 formed in a circumferential wall of the housing 1. Pressurized oil is supplied to and discharged from the release chamber 9 via a release supply-and-discharge passage 11 formed in the circumferential wall of the housing 1. An advancing spring 12 is provided between (i) an upper surface of a lower wall of the housing 1 and (ii) a lower surface of the advancing-retracting member. The advancing spring 12 biases the advancing-retracting member 3 upward. In the present embodiment, an advancing-retracting mechanism 13, which moves the advancing-retracting member 3 in the vertical direction, is constituted by the lock chamber 8, the release chamber 9, and the advancing spring 12.

A support cylinder 17 is inserted into an upper side of an inner circumferential hole 16 of the advancing-retracting member 3, so as to be movable in the vertical direction. The support cylinder 17 includes a flange portion 17a, a circumferential wall 17b, and a top portion 17c, which are provided in this order from bottom to top. A step portion is formed at an intermediate-height portion of medium-diameter hole 16c of the inner circumferential hole 16. A flange portion 17a is mounted to an upper surface of the step portion, with an elastic member (biasing means) 18 being provided between the flange portion 17a and the upper surface of the step portion. The elastic member 18 is, for example, rubber, resin, a plate spring, or a coil spring. The elastic member 18 biases the support cylinder 17 upward. A protruding portion 19 is provided to a top end portion of the inner circumferential hole 16 so as to protrude inwardly in a radial direction. A lower surface of protruding portion 19 receives an upper surface of the flange portion 17a of the support cylinder 17. A workpiece (object to be fixed) 20 is conveyed by a conveyor (conveying mechanism; not illustrated) in the direction indicated by the arrow in FIG. 1 (rightward direction), so as to be above the support cylinder 17. A circumferential wall 17b and a top wall 17c of the support cylinder 17 can be inserted into a hole 21 of the workpiece 20.

The inner circumferential hole 16 of the advancing-retracting member 3 includes a small-diameter hole 16a, a large-diameter hole 16b, and the medium-diameter hole 16c, which are provided in this order from bottom to top. A piston 25 of an output member 24 is hermetically inserted into the large-diameter hole 16b of the inner circumferential hole 16, so as to be movable in the vertical direction. A lower rod 26 is provided to the piston 25 so as to protrude downwardly therefrom. The lower rod 26 is hermetically inserted into the small-diameter hole 16a. An output rod 27 is provided to the piston 25 so as to protrude upwardly therefrom. The output rod 27 is hermetically inserted into the medium-diameter hole 16c and is inserted into an inner circumferential hole 22 of the support cylinder 17. A unclamp chamber 30 is formed below the piston 25, and a clamp chamber 31 is formed above the piston 25. A return spring 32 is provided in the unclamp chamber 30 and biases the piston 25 upward with respect to the advancing-retracting member 3. The unclamp chamber 30 and the release chamber 9 are in communicating via a first communication passage 33 formed in a circumferential wall of the advancing-retracting member 3. The clamp chamber 31 and the lock chamber 8 are in communication via a second communication passage 34 formed in the output member 24. In the present embodiment, a driving mechanism 35 is constituted by the unclamp chamber 30, the clamp chamber 31, and the return spring 32.

Three guide holes 38 are formed in the circumferential wall 17b of the support cylinder 17 at predetermined intervals in a circumferential direction (note that only one of the three guide holes 38 is illustrated in FIGS. 1 to 3). An engaging member 39 is inserted into each of the guide holes 38 so as to be movable in the radial direction. A receiving surface 40 is formed on an inner wall surface of each of the engaging members 39. The receiving surface 40 is formed so as to become increasingly near to an axial center in a downward direction. A pushing portion 41 is formed along an outer circumference of an advancement-direction end portion of the output rod 27. The pushing portion 41 is formed so as to become increasingly near to the axial center in a downward direction. The pushing portion 41 engages the receiving surfaces 40 of the engaging members 39, in a wedge-like manner from above.

A groove 39*a* is formed, in the circumferential direction, along an outer circumference of each of the engaging members 39. A groove 17*d* is formed, in the circumferential direction, along an outer circumference of the support cylinder 17, at vertical position corresponding to that of the grooves 39*a*. A ring 44 is fitted into the grooves 39*a* of the engaging members 39 and the groove 17*d* of the support cylinder 17. The ring 44 is thin and is an elastic member, such as rubber or a plate spring. The ring 44 biases the engaging members 39 inwardly in the radial direction. With this configuration, the elastic force of the ring 44 causes the engaging members 39 to be contained more inward, in the radial direction, than an outer circumferential surface of the support cylinder 17. This makes it possible to prevent the engaging members 39 from colliding with the workpiece 20 when the support cylinder 17 is inserted into the hole 21 of the workpiece 20.

A magnetic body 45, such as a permanent magnet, is mounted to an outer circumferential portion of the piston portion 3*a*. Magnetic sensors 46 and 47 are provided to the circumferential wall of the housing 1 in a manner such that they can be opposite the magnetic body 45.

The clamping device operates as follows.

In the lowered and unclamped state illustrated in FIG. 1, pressurized oil is discharged from the lock chamber 8 and the clamp chamber 31, and pressurized oil is supplied to the unclamp chamber 30 and the release chamber 9. The pressurized oil in the release chamber 9 acts against the biasing force of the advancing spring 12 and causes the advancing-retracting member 3 to move to a lower limit position (a position on the base end side). At the same time, the return spring 32 and the pressurized oil in the unclamp chamber 30 cause the piston 25 and the output rod 27 to move to respective upper limit positions. As this happens, the elastic force of the ring 44 causes the engaging members 39 to move inward in the radial direction. In the lowered and unclamped state, the upper surface of the top portion 17*c* of the support cylinder 17 has been moved so as to be lower than a bottom surface 20*a* of the workpiece 20. This makes it possible to prevent the workpiece 20 from colliding with the support cylinder 17 and becoming damaged when the workpiece 20 is conveyed in a direction intersecting with (orthogonal to) the axis direction (i.e., the direction indicated by the arrow in FIG. 1).

At this time, the magnetic body 45 is moved to a lower limit position at which it is opposite the magnetic sensor 47, and thus the magnetic sensor 47 detects that the advancing-retracting member 3 has moved to the lower limit position.

In the lowered and unclamped state illustrated in FIG. 1, the workpiece 20 is moved (conveyed) horizontally by a transport mechanism such that the hole 21 of the workpiece 20 is positioned above and opposite to the support cylinder 17.

When the clamping device changes from the lowered and unclamped state illustrated in FIG. 1 to the raised and unclamped state illustrated in FIG. 2, as the pressurized oil is discharged from the unclamp chamber 30 and the release chamber 9, the advancing spring 12 causes the advancing-retracting member 3 to rise. The advancing-retracting member 3 causes the support cylinder 17 to be inserted into the hole 21 of the workpiece 20, and then the advancing-retracting member 3 lifts the workpiece 20 via a pressing surface 4. In this way, the clamping device changes to the raised and unclamped state illustrated in FIG. 2.

At this time, the magnetic body 45 is moved to an upper limit position at which it is opposite the magnetic sensor 46, and thus the magnetic sensor 46 detects that the advancing-retracting member 3 has moved to the upper limit position.

When the clamping device changes from the raised and unclamped state illustrated in FIG. 2 to the raised and clamped state illustrated in FIG. 3, pressurized oil is supplied to the clamp chamber 31 and the lock chamber 8. As the pressurized oil is supplied thusly, the advancing-retracting member 3 is supported in the upper limit position by (i) a pushing force equivalent to the pressure of the lock chamber 8 and (ii) the biasing force of the advancing spring 12, and the pressurized oil in the clamp chamber 31 acts against the biasing force of the return spring 32 so as to cause the piston 25 and the output rod 27 to lower. Then, the pushing portion 41 of the output rod 27 causes the engaging members 39 to move outward in the radial direction via the receiving surface 40. Furthermore, the outer circumferential surfaces of the engaging members 39 push against the inner circumferential surface of the hole 21 of the workpiece 20, and the output rod 27 causes the engaging members 39 to move downward against the biasing force of the elastic member 18. This strongly fixes the workpiece 20 to the pressing surface 4 of the advancing-retracting member 3. In this way, the clamping device changes to the raised and clamped state illustrated in FIG. 3.

When the clamping device changes from the raised and clamped state illustrated in FIG. 3 to the lowered and unclamped state illustrated in FIG. 1, firstly, pressurized oil is discharged from the clamp chamber 31 and the lock chamber 8, and then pressurized oil is supplied to the unclamp chamber 30 and the release chamber 9. This causes the clamping device to change to the lowered and unclamped state via a process that is basically the reverse of the above-described clamping operation.

Embodiment 1 brings about the following advantages.

The advancing-retracting mechanism 13 moves the advancing-retracting member 3 such that the support cylinder 17 is moved upward, from the lower limit position which is lower than the bottom surface 20*a* of the workpiece 20, so as to insert the support cylinder 17 into the hole 21 of the workpiece 20. The advancing-retracting mechanism 13 also causes the pressing surface 4 of the advancing-retracting member 3 to strongly press against the workpiece 20 so as to move the workpiece 20 to an upper limit position. As such, unlike the above-described conventionally proposed technique, there is no need to provide a separate raising and lowering mechanism for moving the main body of the clamping device in the vertical direction. It is therefore possible to produce a compact clamping device which has a function (lifting function) of lifting the workpiece 20.

Figure 4A:
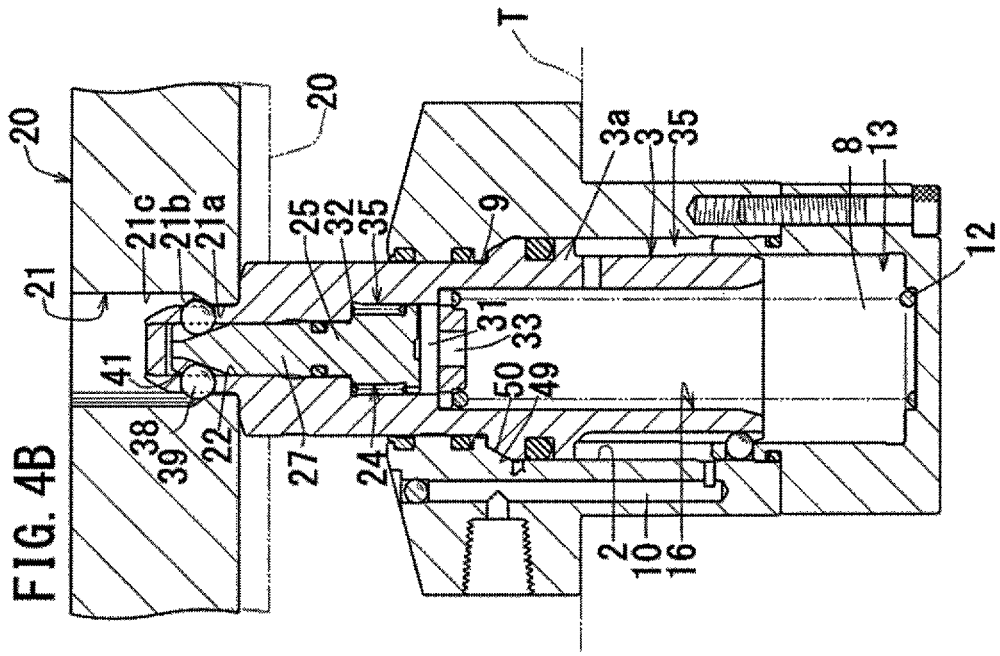
FIG. 4A, which is similar to FIG. 1, illustrates Embodiment 2 of the present invention.
Figure 4B:
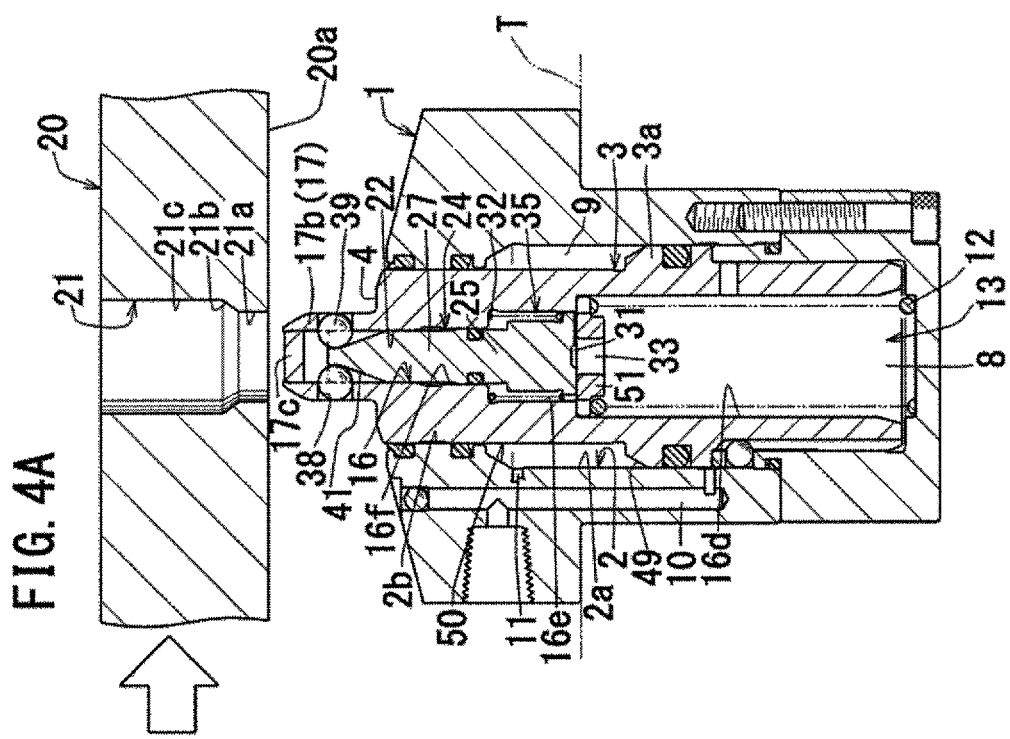
FIG. 4B, which is similar to FIG. 3, illustrates the clamping device in a raised and clamped state.
Figure 5B:
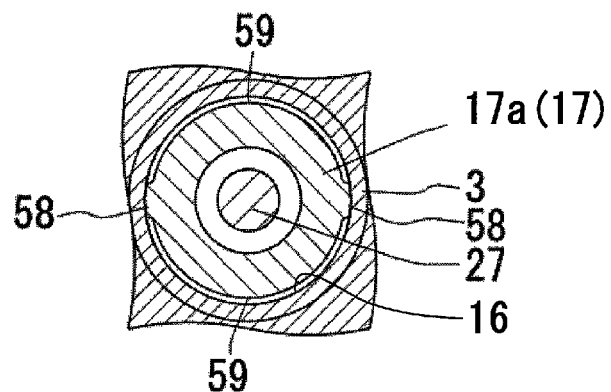
FIG. 5B is a view taken along the line VB-VB in FIG. 5A.
Figure 5A:
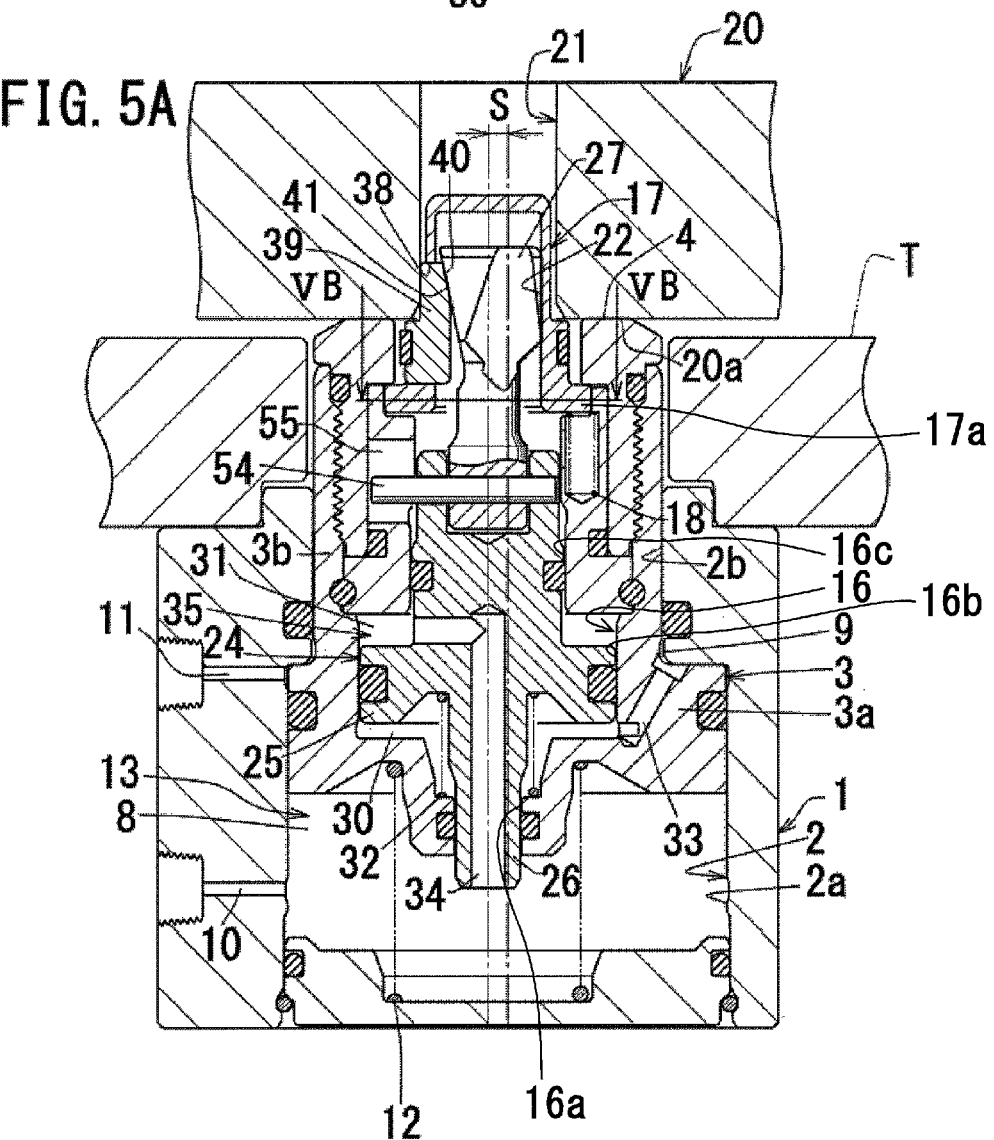
FIG. 5A, which is similar to FIG. 3, illustrates Embodiment 3 of the present invention.

FIGS. 4A and 4B illustrate Embodiment 2 of the present invention, and FIGS. 5A and 5B illustrate Embodiment 3 of the present invention. In the descriptions of Embodiments 2 and 3, members which are identical (or similar) to those of Embodiment 1 are, as a general rule, given identical reference numbers.

Embodiment 2, which is illustrated in FIGS. 4A and 4B, differs from Embodiment 1 on the following points. In Embodiment 2, a support cylinder 17 is provided to an advancing-retracting member 3 in an integrated manner so as to protrude therefrom. The support cylinder 17 is insertable into a hole 21 of a workpiece 20. The hole 21 includes a small-diameter hole 21*a*, a tapered hole 21*b*, and a large-diameter hole 21*c*, which are provided in this order from bottom to top. The tapered hole 21*b* is formed so as to become increasingly distant from an axial center in an upward direction. Engaging members 39 are provided such that they can engage the tapered hole 21*b* of the workpiece 20. Each of the engaging members 39 is constituted by an engaging ball inserted into a respective guide hole 38, formed in the support cylinder 17, so as to be movable in a radial direction.

An engaging portion 49 is provided to an upper part of a piston portion 3a of the advancing-retracting member 3. The engaging portion 49 is provided so as to become increasingly narrow in an upward direction. A receiving portion 50 is provided to an upper surface of a large-diameter hole 2a of a containing hole 2. The receiving portion 50 is formed so as to become increasingly narrow along the advancement direction. The engaging portion 49 can engage the receiving portion 50. With this configuration, when the advancing-retracting mechanism 13 moves the advancing-retracting member 3 to an upper limit position so that the engaging portion 49 of the advancing-retracting member 3 engages the receiving portion 50 of the containing hole 2, a horizontal position of the advancing-retracting member 3 is determined with respect to a housing 1.

An output member 24 is inserted into an inner circumferential hole 16 of the advancing-retracting member 3. The inner circumferential hole 16 of the advancing-retracting member 3 includes a large-diameter hole 16d, a medium-diameter hole 16e, and a small-diameter hole 16f, which are provided in this order from bottom to top. An advancing spring 12 and a spring receiving member 51 are provided in the large-diameter hole 16d. A piston 25 of the output member 24 is hermetically inserted into the small-diameter hole 16f so as to be movable in the vertical direction. An output rod 27 having the same diameter as the piston 25 is formed on an upper part of the piston 25 in an integrated manner.

A clamp chamber 31 is formed below the piston 25. A return spring 32 is provided above the piston 25 and biases the piston 25 downward with respect to the advancing-retracting member 3. The clamp chamber 31 and a lock chamber 8 are in communication via a first communication passage 33 which passes through the spring receiving member 51 in the vertical direction. In the present embodiment, a driving mechanism 35 is constituted by the clamp chamber 31 and the return spring 32.

Two guide holes 38 are formed in a circumferential wall 17b of the support cylinder 17 at predetermined intervals in a circumferential direction. A respective one of the engaging members 39, constituted by an engaging ball, is inserted into each of the guide holes 38 so as to be movable in a radial direction of the support cylinder 17. A pushing portion 41 is formed along an outer circumference of an advancement-direction end portion of the output rod 27. The pushing portion 41 is formed so as to become increasingly near to the axial center in an upward direction. The pushing portion 41 engages the engaging members 39 in a wedge-like manner from below.

The clamping device operates as follows.

In the lowered and unclamped state illustrated in FIG. 4A, pressurized oil is discharged from the lock chamber 8 and the clamp chamber 31, and pressurized oil is supplied to the release chamber 9. The pressurized oil in the release chamber 9 acts against the biasing force of the advancing spring 12 and causes the advancing-retracting member 3 to move to a lower limit position. At the same time, the biasing force of the return spring 32 causes the piston 25 and the output rod 27 to move to respective lower limit positions. As this happens, the engaging members 39 are allowed to move inward in the radial direction. In the lowered and unclamped state, the upper surface of the top portion 17c of the support cylinder 17 has been moved so as to be at a position at which a gap is left between (i) the upper surface of the top portion 17c and (ii) a lower surface 20a of the workpiece 20 which is conveyed. This makes it possible to prevent the workpiece 20 from colliding with the support cylinder 17 and becoming damaged when the workpiece 20 is conveyed in the direction indicated by the arrow in FIG. 4A.

In the lowered and clamped state illustrated in FIG. 4A, the workpiece 20 is moved (conveyed) in the direction indicated by the arrow in FIG. 4A by a transport mechanism such that the hole 21 of the workpiece 20 is positioned above and opposite to the support cylinder 17.

When the clamping device changes from the lowered and unclamped state illustrated in FIG. 4A to a raised and unclamped state, as the pressurized oil is discharged from the release chamber 9, the biasing force of the advancing spring 12 causes the advancing-retracting member 3 to rise. As this happens, the support cylinder 17 is inserted into the hole 21 of the workpiece 20, and then the advancing-retracting member 3 presses against the workpiece 20 so as to move the workpiece 20 from a vertical position to which it had been conveyed (the vertical position of the workpiece 20 as indicated by the two-dot chain line in FIG. 4B) to an upper limit position. In this way, the clamping device changes to the raised and unclamped state illustrated in FIG. 2.

When the clamping device changes from the raised and unclamped state to the raised and clamped state illustrated in FIG. 4B, pressurized oil is supplied to the clamp chamber 31 and the lock chamber 8. As the pressurized oil is supplied thusly, the advancing-retracting member 3 is supported in the upper limit position by (i) a pushing force equivalent to the pressure of the lock chamber 8 and (ii) the biasing force of the advancing spring 12, and the pressurized oil in the clamp chamber 31 acts against the biasing force of the return spring 32 so as to cause the piston 25 and the output rod 27 to rise. Then, the pushing portion 41 of the output rod 27 causes the engaging members 39 to move outward in the radial direction via outer circumferential surfaces of the pushing portion 41. Furthermore, the outer circumferential surfaces of the engaging members 39 push against an inner circumferential surface of the hole 21 of the workpiece 20. This strongly fixes the workpiece 20 to the pressing surface 4 of the advancing-retracting member 3. In this way, the clamping device changes to the raised and clamped state illustrated in FIG. 4B.

When the clamping device changes from the raised and clamped state illustrated in FIG. 4B to the lowered and unclamped state illustrated in FIG. 4A, firstly, pressurized oil is discharged from the clamp chamber 31 and the lock chamber 8, and then pressurized oil is supplied to the release chamber 9. This causes the clamping device to change to the lowered and unclamped state via a process that is basically opposite to the above-described clamping operation.

Embodiment 2 brings about the following advantages.

The advancing-retracting mechanism 13 moves the advancing-retracting member 3 such that the support cylinder 17 is moved upward, from the lower limit position which is lower than the bottom surface 20a of the workpiece 20, so as to insert the support cylinder 17 into the hole 21 of the workpiece 20. The advancing-retracting mechanism 13 also causes the pressing surface 4 of the advancing-retracting member 3 to strongly press against the workpiece 20 so as to move the workpiece 20 to an upper limit position. As such, unlike the above-described conventionally proposed technique, there is no need to provide a separate raising and lowering mechanism for moving the main body of the clamping device in the vertical direction. It is therefore possible to produce a compact clamping device which has a function (lifting function) of lifting the workpiece 20.

Embodiment 3, which is illustrated in FIGS. 5A and 5B, differs from Embodiment 1 on the following points.

A clamping device has a housing 1 whose upper surface is fixed to a lower surface of a table T serving as a fixing base. An advancing-retracting member 3 is hermetically inserted into a containing hole 2 of the housing 1 so as to be raisable and lowerable. The advancing-retracting member 3 is also inserted into a hole passing through the table T in a vertical direction. The containing hole 2 includes a large-diameter hole 2a and a small-diameter hole 2b, which are provided in this order from bottom to top. The large-diameter hole 2a is provided at a position such that an axial center of the large-diameter hole 2a is horizontally offset, toward the right by a distance S, from an axial center of the small-diameter hole 2b. The advancing-retracting member 3, which is tubular, is hermetically inserted into the containing hole 2 so as to be movable in an axis direction. The advancing-retracting member 3 includes a piston portion 3a and a support portion 3b, which are provided in this order from bottom to top. The piston portion 3a is hermetically inserted into the large-diameter hole 2a so as to be movable in the vertical direction. The support portion 3b is inserted into the small-diameter hole 2b.

A support cylinder 17 is inserted into an upper side of an inner circumferential hole 16 of the advancing-retracting member 3 so as to be movable in an axis direction. The support cylinder 17 is biased upward by an advancing spring 12 provided below the advancing-retracting member 3. As illustrated in FIG. 5B, the support cylinder 17 has a flange portion 17a, and a pair of protrusions 58 and 58 are provided to an outer circumferential surface of the flange portion 17a in a manner opposite each other so as to sandwich an axial center of the support cylinder 17. A pair of clearance portions 59 and 59 are formed such that each of the clearance portions 59 and 59 extends in a circumferential direction between the pair of protrusions 58 and 58. First gaps, each of which is formed between (i) a respective one of the protrusions 58 and (ii) the inner circumferential hole 16 of the advancing-retracting member 3, are smaller than second gaps, each of which is formed between (ii) a respective one of the clearance portions 59 and (ii) the inner circumferential hole 16 of the advancing-retracting member 3. For example, each of the first gaps measures not less than 0.01 mm and not more than 0.03 mm, and each of the second gaps measures not less than 0.1 mm and not more than 0.2 mm.

With this configuration, even in a case where there is an error in which the axial center of the support cylinder 17 is horizontally offset from the axial center of the workpiece 20 when the support cylinder 17 is inserted into the hole 21 of the workpiece 20, it is possible to determine the position of the workpiece 20 in a direction along which the pair of protrusions 58 and 58 of the support cylinder are opposingly provided, and the pair clearance portions 59 and 59 provide enough clearance to absorb the error. This enables the clamping device to operate smoothly.

An output member 24 is inserted into a lower side of the inner circumferential hole 16 of the advancing-retracting member 3. The inner circumferential hole 16 the advancing-retracting member 3 includes a small-diameter hole 16a, a large-diameter hole 16b, and a medium-diameter hole 16c, which are provided in this order from bottom to top. A piston 25 of the output member 24 is hermetically inserted into the large-diameter hole 16b, so as to be movable in the vertical direction. A lower rod 26 is provided to the piston 25 so as to protrude downwardly therefrom. The lower rod 26 is hermetically inserted into the small-diameter hole 16a. An output rod 27 is connected to an upper part of the piston 25 via a pin 54 so as to be movable in an axis direction of the pin 54. The pin 54 is provided so as to protrude leftward. A guide hole 55 which guides the pin 54 in the vertical direction is formed in an inner circumferential surface of a circumferential wall of the advancing-retracting member 3. With this configuration, rotation of the output rod 27 is prevented by the advancing-retracting member 3, via the pin 54 and the guide hole 55.

An axial center of the large-diameter hole 2a of the containing hole 2 is horizontally offset by a distance S from an axial center of the small-diameter hole 2b. This prevents rotation of the advancing-retracting member 3 with respect to the housing 1.

Embodiment 3 brings about the following advantages.

The advancing-retracting mechanism 13 has both (i) a function of inserting the support cylinder 17 into the hole 21 from below the workpiece 20 by moving the advancing-retracting member 3 and (ii) a function of strongly pushing against the workpiece 20 via the pressing surface 4 of the advancing-retracting member 3 so as to move the workpiece 20 upward. As such, unlike the above-described conventionally proposed technique, there is no need to provide a separate raising and lowering mechanism for moving the main body of the clamping device in the vertical direction. It is therefore possible to produce a compact clamping device which has a function of lifting the workpiece 20.

The above embodiments can be modified as follows.

Instead of being formed on the upper surface of the advancing-retracting member 3, the pressing surface 4 may be (i) formed on an upper surface of a flange portion formed in a lower part of the engaging members 39 or (ii) formed on an upper surface of the flange portion 17a of the support cylinder 17. Instead of directly supporting the lower surface of the workpiece 20, the pressing surface 4 may support a cap fixed to the lower surface of the workpiece 20.

The advancing-retracting mechanism 13 and the driving mechanism 35 can be single-action oil pressure cylinders, instead of the double-action oil pressure cylinders as exemplified above. Furthermore, the advancing-retracting mechanism 13 and the driving mechanism 35 can alternatively be liquid pressure actuators utilizing some other pressure liquid or electric actuators.

Instead of being inserted into the inner circumferential hole 16 of the advancing-retracting member 3 so as to be movable in the vertical direction, the support cylinder 17 can be provided to the advancing-retracting member 3 in an integrated manner so as to protrude upward from the advancing-retracting member 3. The top wall 17c of the support cylinder 17 and/or the circumferential wall 17b of the support cylinder 17 may be omitted.

The engaging members 39 may alternatively be engaging balls or an annular collet. The annular collet may be supported by the support cylinder 17 so as to be externally fitted to the pushing portion 41 of the output rod 27. A vertical slit is formed in a circumferential wall of the annular collet. An outer circumferential surface of the annular collet has a plurality of circumferential groove which appear saw-like in a cross-sectional view. When the output member 24 is driven so as to carry out clamping, the pushing portion presses against the annular collet such that the annular collet elastically deforms outwardly in the radial direction and engages the hole 21 formed in the workpiece 20.

Instead of there being two protrusions 58 provided to the outer circumferential surface of the support cylinder 17, there may be three or more protrusions 58 provided at predetermined intervals in the circumferential direction.

Instead of the configuration in which the protrusions 58 and the clearance portions 59 are formed in the outer circumferential surface of the flange portion 17a of the support cylinder 17, a configuration may be employed in which protrusions and clearance portions are formed in the inner circumferential surface of the inner circumferential hole 16 of the advancing-retracting member 3, which inner circumferential surface faces the outer circumferential surface of the flange portion 17a.

Various other alterations can of course be made within the scope which a person skilled in the art would expect.

Overview of Embodiments of the Present Invention

In order to attain the above object, embodiments of the present invention include a clamping device, having a lifting function, which clamping device is for example configured as follows and as illustrated in FIGS. 1 to 3, FIGS. 4A and 4B, or FIGS. 5A and 5B.

An advancing-retracting member 3 which is tubular is inserted into a housing 1 so as to be movable in an axis direction. An advancing-retracting mechanism 13 is provided to the housing 1 and moves the advancing-retracting member 3 in the axis direction. A support cylinder 17 which is provided in a manner so as to protrude in an advancement direction from the advancing-retracting member 3 is insertable into a hole 21 formed in an object to be fixed 20. An output member 24 is hermetically inserted into an inner circumferential hole 22 of the support cylinder 17 so as to be movable in the axis direction. A pushing portion 41 is formed along an outer circumference of an advancement-direction end portion of the output member 24. A driving mechanism 35 provided in the advancing-retracting member 3 moves the output member 24 in the axis direction. Engaging members 39 are inserted into respective guide holes 38 of the support cylinder 17 so as to be movable in a radial direction, the guide holes 38 being formed in a circumferential wall of the support cylinder 17 at predetermined intervals in a circumferential direction. The engaging members 39 each have an inner circumferential surface which the pushing portion 41 engages in a wedge-like manner. A pressing surface 4 formed in an advancement-direction end portion of the advancing-retracting member 3 is able to move the object to be fixed 20 by pressing against the object to be fixed 20. In a case where the advancing-retracting mechanism 13 moves the advancing-retracting member 3 such that the support cylinder 17 is moved in the advancement direction from a position which is more toward a base end side than is a base end surface 20a of the object to be fixed, the support cylinder 1 is inserted into the hole 21 of the object to be fixed 20, and the advancing-retracting member 3 presses against the object to be fixed 20 via the pressing surface 4 so as to move the object to be fixed 20 toward a position downstream in the advancement direction.

The above aspect of the present invention has the following effects.

The advancing-retracting mechanism moves the advancing-retracting member such that the support cylinder is moved in the advancement direction from a position which is more toward a base end side than is a base end surface of the object to be fixed, so that the support cylinder is inserted into the hole. The advancing-retracting mechanism also causes the pressing surface of the advancing-retracting member to strongly press against the object to be fixed so as to move the object to be fixed toward a position downstream in the advancement direction. As such, unlike the above-described conventionally proposed technique, there is no need to provide a separate raising and lowering mechanism for moving the main body of the clamping device in the vertical direction. It is therefore possible to produce a compact clamping device which has a function of lifting the workpiece.

In aspects of the present invention, the following configurations (1) through (5) can be preferably added.

(1) The advancing-retracting mechanism 13 includes a lock chamber 8, a release chamber 9, and an advancing spring 12. A piston portion 3a is formed at a base end part of the advancing-retracting member 3. A lock chamber 8 is formed on a base end side of the piston portion 3a. A pressurized fluid can be supplied into and discharged from the lock chamber 8. A release chamber 9 is formed on an advancement direction side of the piston portion 3a. The pressurized fluid can be supplied into and discharged from the release chamber 9. An advancing spring 12 is provided to the lock chamber 8 so as to bias the advancing-retracting member 3 in the advancement direction.

With the above configuration, when the pressurized fluid is discharged from the release chamber, the advancing spring moves the advancing-retracting member in the advancement direction. Furthermore, when the pressurized fluid is supplied to the lock chamber, it is possible to support the advancing-retracting member at its position along the advancement direction by (i) a pushing force equivalent to the pressure of the pressurized fluid in the lock chamber and (ii) the biasing force of the advancing spring.

(2) The driving mechanism 35 includes a clamp chamber 31, an unclamp chamber 30, and a return spring 32. A piston 25 is provided at a base end part of the output member 24. A clamp chamber 31 is formed on an advancement direction side or a base end side of the piston 25. The pressurized fluid can be supplied into and discharged from the clamp chamber 31. An unclamp chamber 30 is formed on a side of the piston 25 which side is opposite to the clamp chamber 31. A return spring 32 is provided to the unclamp chamber 30. The clamp chamber 31 is in communication with the lock chamber 8.

With the above configuration, when the advancing-retracting member is at its most advanced position in the advancement direction and the output member is driven toward the base end side so as to carry out clamping, the advancing-retracting member is strongly supported by (i) the pressure of the pressurized fluid in the lock chamber and (ii) the biasing force of the advancing spring so as not to shift toward the base end side. At the same time, the pressurized fluid in the clamp chamber drives the output member against the return spring so as to carry out clamping. As such, the output rod pushes against the hole of the object to be fixed, via the engaging member, with a large force equivalent to the force of pressure of pressurized fluid in the clamp chamber minus the biasing force of the return spring. The clamping device is therefore able to strongly fix the object to be fixed.

(3) In a case where the advancing-retracting mechanism 13 causes the advancing-retracting member 3 to move to a predetermined position along the advancement direction, an engaging portion 49 provided to the advancing-retracting member 3 engages a receiving portion 50 provided to the housing 1, the engaging portion 49 and the receiving portion 50 each being formed so as to become increasingly narrow along the advancement direction.

With this configuration, when the advancing-retracting member is at the predetermined position along the advancement direction, the engaging portion of the advancing-retracting member engages the receiving portion of the housing such that movement of the advancing-retracting member is restricted in the horizontal direction and in a perpendicular direction. As such, the respective axial centers of the advancing-retracting member and the housing are accurately aligned.

(4) The support cylinder 17 is inserted into the inner circumferential hole 16 of the advancing-retracting member 3. A pair of protrusions 58 and 58 are provided to an outer circumferential surface of the support cylinder 17 in a manner opposite to each other so as to sandwich an axial center of the support cylinder 17. Each of the pair of protrusions 58 and 58 fits with the inner circumferential hole 16. A pair of clearance portions 59 and 59 are formed such that each of the clearance portions 59 and 59 extends in a circumferential direction between the pair of protrusions 58 and 58.

With this configuration, even in a case where the axial center of the support cylinder is offset from the axial center of the object to be fixed when the support cylinder is inserted into the hole of the object to be fixed, it is possible to determine the position of the object to be fixed in a direction along which the pair of protrusions are opposingly provided, and the pair clearance portions provide enough clearance to absorb the error. This enables the clamping device to operate smoothly.

(5) The support cylinder 17 is inserted into the inner circumferential hole 16 of the advancing-retracting member 3. Three or more protrusions 58, 58, and 58 are provided to an outer circumferential surface of the support cylinder 17 at predetermined intervals in the circumferential direction. Each of the three or more protrusions 58, 58, and 58 fits with the inner circumferential hole 16. Three or more clearance portions 59, 59, and 59 are formed such that each of the clearance portions 59, 59, and 59 extends in a circumferential direction between a respective pair of the three or more protrusions 58, 58, and 58.

With this configuration, even in a case where the axial center of the support cylinder is offset from the axial center of the object to be fixed when the support cylinder is inserted into the hole of the object to be fixed, it is possible to determine the position of the object to be fixed in a radial direction.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST

1: Housing
3: Advancing-retracting member
3a: Piston portion
4: Pressing surface
8: Lock chamber
9: Release chamber
12: Advancing spring
13: Advancing-retracting mechanism
16: Inner circumferential hole
17: Support cylinder
20: Workpiece (object to be fixed)
21: Hole
22: Inner circumferential hole
24: Output member
25: Piston
30: Unclamp chamber
31: Clamp chamber
32: Return spring
35: Driving mechanism
38: Guide hole
39: Engaging member
41: Pushing portion
49: Engaging portion
50: Receiving portion
58: Protrusion
59: Clearance portion

The invention claimed is:

1. A clamping device having a lifting function, comprising:
an advancing-retracting member (3) which is tubular and is inserted into a housing 1 so as to be movable in an axis direction;
an advancing-retracting mechanism (13) which is provided to the housing (1) so as to move the advancing-retracting member (3) in the axis direction;
a support cylinder (17) which is provided in a manner so as to protrude in an advancement direction from the advancing-retracting member (3) and be insertable into a hole (21) formed in an object to be fixed (20);
an output member (24) which is inserted into an inner circumferential hole (22) of the support cylinder (17) so as to be movable in the axis direction, the output member (24) having a pushing portion (41) formed along an outer circumference of an advancement-direction end portion of the output member (24);
a driving mechanism (35) provided in the advancing-retracting member (3) so as to move the output member (24) in the axis direction;
engaging members (39) inserted into respective guide holes (38) of the support cylinder (17) so as to be movable in a radial direction, the guide holes (38) being formed in a circumferential wall of the support cylinder (17) at predetermined intervals in a circumferential direction, the engaging members (39) each having an inner circumferential surface which the pushing portion 41 engages; and
a pressing surface (4) formed in an advancement-direction end portion of the advancing-retracting member (3) so as to be able to move the object to be fixed (20) by pressing against the object to be fixed (20),
wherein in a case where the advancing-retracting mechanism (13) moves the advancing-retracting member (3) such that the support cylinder (17) is moved in the advancement direction from a position which is more toward a base end side than is a base end surface (20a) of the object to be fixed, the support cylinder (17) is inserted into the hole (21) of the object to be fixed (20), and the advancing-retracting member (3) presses against the object to be fixed (20) via the pressing surface (4) so as to move the object to be fixed (20) toward a position downstream in the advancement direction.

2. The clamping device as set forth in claim 1, wherein the advancing-retracting mechanism 13 includes:
a piston portion (3a) formed at a base end part of the advancing-retracting member (3);
a lock chamber (8) into which a pressurized fluid can be supplied and from which the pressurized fluid can be discharged, the lock chamber (8) being formed on a base end side of the piston portion (3a);

a release chamber (9) into which the pressurized fluid can be supplied and from which the pressurized fluid can be discharged, the release chamber (9) being formed on an advancement direction side of the piston portion (3a); and an advancing spring (12) which is provided to the lock chamber (8) so as to bias the advancing-retracting member (3) in the advancement direction.

3. The clamping device as set forth in claim 2, wherein:
a piston (25) is provided at a base end part of the output member (24); and
the driving mechanism (35) includes:
   a clamp chamber (31) into which the pressurized fluid can be supplied and from which the pressurized fluid can be discharged, the clamp chamber (31) being formed on an advancement direction side or a base end side of the piston (25), the clamp chamber (31) being in communication with the lock chamber (8);
   an unclamp chamber (30) formed on a side of the piston (25) which side is opposite to the clamp chamber (31); and
   a return spring (32) provided to the unclamp chamber (30).

4. The clamping device as set forth in claim 1, wherein in a case where the advancing-retracting mechanism (13) causes the advancing-retracting member (3) to move to a predetermined position along the advancement direction, an engaging portion (49) provided to the advancing-retracting member (3) engages a receiving portion (50) provided to the housing (1), the engaging portion (49) and the receiving portion (50) each being formed so as to become increasingly narrow along the advancement direction.

5. The clamping device as set forth in claim 1, wherein:
the support cylinder (17) is inserted into an inner circumferential hole (16) of the advancing-retracting member (3);
a pair of protrusions (58, 58) are provided to an outer circumferential surface of the support cylinder (17) in a manner opposite to each other so as to sandwich an axial center of the support cylinder (17), each of the pair of protrusions (58, 58) fitting with the inner circumferential hole (16); and
a pair of clearance portions (59, 59) are formed such that each of the clearance portions (59, 59) extends in a circumferential direction between the pair of protrusions (58, 58).

6. The clamping device as set forth in claim 1, wherein:
the support cylinder (17) is inserted into an inner circumferential hole (16) of the advancing-retracting member (3);
three or more protrusions (58, 58, 58) are provided to an outer circumferential surface of the support cylinder 17 at predetermined intervals in the circumferential direction, each of the three or more protrusions (58, 58, 58) fitting with the inner circumferential hole (16); and
three or more clearance portions (59, 59, 59) are formed such that each of the clearance portions (59, 59, 59) extends in a circumferential direction between a respective pair of the three or more protrusions (58, 58, 58).

* * * * *